US011663349B2

(12) United States Patent
Alsamarrie et al.

(10) Patent No.: US 11,663,349 B2
(45) Date of Patent: May 30, 2023

(54) SYSTEM AND METHOD FOR MANAGING DATA OBJECT CREATION

(71) Applicant: BCE Inc., Montreal (CA)

(72) Inventors: Aws Aied Khalaf Alsamarrie, Toronto (CA); Harshavardhan Gadgil, Toronto (CA); Eric Beaudet, Montreal (CA); Vaibhav Sharma, Brampton (CA); Calvin Kana Ouellet-Ference, Montreal (CA); Viacheslav Kriuchkov, Notre-Dame-de-l'Ile-Perrot (CA); Agata Roj, Mississauga (CA); Stephane Vellet, Sainte-Julienne (CA); Alain Dumont, Blainville (CA); Yong Kyun Roh, North York (CA); George Iskenderian, Toronto (CA)

(73) Assignee: BCE Inc., Montreal (CA)

( * ) Notice: Subject to any disclaimer, the term of this patent is extended or adjusted under 35 U.S.C. 154(b) by 6 days.

(21) Appl. No.: 17/122,443

(22) Filed: Dec. 15, 2020

(65) Prior Publication Data
US 2021/0182412 A1    Jun. 17, 2021

Related U.S. Application Data

(60) Provisional application No. 62/948,418, filed on Dec. 16, 2019.

(51) Int. Cl.
*G06F 21/00* (2013.01)
*G06F 21/62* (2013.01)
(Continued)

(52) U.S. Cl.
CPC .......... *G06F 21/6209* (2013.01); *G06F 21/45* (2013.01); *G06F 21/604* (2013.01);
(Continued)

(58) Field of Classification Search
CPC .... G06F 21/6209; G06F 21/45; G06F 21/604; G06F 2221/2141; G06F 2221/2145
See application file for complete search history.

(56) References Cited

U.S. PATENT DOCUMENTS

| 10,338,958 B1 | 7/2019 | Kamboj et al. |
| 2009/0177671 A1 | 7/2009 | Pellegrini et al. |

(Continued)

OTHER PUBLICATIONS

Bhowmick., "Continuous Integration and Continuous Delivery for Database Changes," Database Zone Analysis, May, 10 pages, https://dzone.com/articles/continuous-integration-and-continuous-delivery-for-2.

(Continued)

*Primary Examiner* — Andrew J Steinle
(74) *Attorney, Agent, or Firm* — Borden Ladner Gervais LLP; Curtis B. Behmann (57) ABSTRACT

A system and method are provided for managing creation of data objects, for example in a network or big data environment. A method comprises: receiving, at a processor, a data object creation command for creating the data object; comparing, at the processor, at least one data object creation parameter with a stored data object creation standard; and initiating creation of the data object in response to the data object creation parameter matching a corresponding parameter in the stored data object creation standard. The data object creation command can be modified to meet the stored data object creation standard, and to change an associated permission level. Embodiments of the present disclosure encapsulate standards defining how to create a data object, such that it is no longer necessary to have a person to make sure that these standards are followed, and automate management of object creation while ensuring conformity to organizational standards.

29 Claims, 8 Drawing Sheets

(51) Int. Cl.
*G06F 21/60* (2013.01)
*G06F 21/45* (2013.01)

(52) U.S. Cl.
CPC ............... *G06F 2221/2141* (2013.01); *G06F 2221/2145* (2013.01)

(56) References Cited

U.S. PATENT DOCUMENTS

| | | |
|---|---|---|
| 2009/0241117 A1 | 9/2009 | Dasgupta et al. |
| 2011/0047525 A1 | 2/2011 | Castellanos et al. |
| 2012/0191476 A1* | 7/2012 | Reid ................. G16H 10/65 705/3 |
| 2012/0215583 A1 | 8/2012 | Kunti et al. |
| 2018/0074803 A1 | 3/2018 | Hirt et al. |
| 2018/0341989 A1 | 11/2018 | Reim et al. |
| 2019/0121875 A1* | 4/2019 | Niu .................... G06F 21/6272 |
| 2020/0012808 A1* | 1/2020 | Lereya ................ G06F 16/221 |
| 2020/0026710 A1 | 1/2020 | Przada et al. |
| 2020/0125558 A1 | 4/2020 | Dageville et al. |
| 2020/0356551 A1 | 11/2020 | Dageville et al. |
| 2020/0379960 A1 | 12/2020 | Zhang et al. |
| 2021/0096979 A1* | 4/2021 | Fasheh ............... G06K 7/10366 |
| 2021/0350398 A1* | 11/2021 | Unagami ............. G06Q 20/102 |

OTHER PUBLICATIONS

Databases as a Challenge for Continuous Delivery, Philipp Hauer's Blog, Java Ecosystem, Kotlin, Engineering Management, Sociology of Software Development, 11 pages, https://phauer.com/2015/databases-challenge-continuous-delivery/.
Get Started With GitLab CI/CD, 4 pages, https://docs.gitlab.com/ee/ci/quick_start/.
The Key to an Effective CI/CD Pipeline: Automated Testing, Smartbear, 3 pages, https://smartbear.com/learn/automated-testing/the-continuous-development-pipeline/.
What is CI/CD?, What Database what Is Database continuous Integration continuous Integration(CI)?(Database CI)?, 27 pages, https://www.datical.com/database-continuous-integration-guide/.
Why and How Database Changes Should Be Included in the Deployment Pipeline, 12 pages, https://www.infoq.com/articles/deployment-pipeline-database-changes.
Apache Hadoop, 3 pages, https://hadoop.apache.org.
Apache Hive Tm, 2 pages, https://hive.apache.org.
Apache Impala Is the Open Source, Native Analytic Database for Apache Hadoop, 1 page, https://impala.apache.org.
Apache Sqoop, 1 page, https://sqoop.apache.org.
GitLab CI/CD, 1 page, https://docs.gitlab.com/ee/ci.
Islam et al., "Oozie: Towards a Scalable Workflow Management System for Hadoop," Sweet '12: Proceedings of the 1st Acm Sigmod Workshop on Scalable Workflow Execution Engines and Technologies, Mar. 2012, vol. 4, pp. 1-10.
Pippal et al., "Data Trasfer From Mysql to Hadoop: Implementers' Perspective," ICTCS '14: Proceedings of the 2014 International Conference on Information and Communication Technology for Competitive Strategies, Nov. 2014, vol. 79, pp. 1-5.
Rbheemana / Sqoop—Automated, 1 page, https://github.com/rbheemana/Sqoop-Automated.
U.S. Appl. No. 17/122,422, Final office action dated Sep. 16, 2022.
U.S. Appl. No. 17/122,422, Final Office Action dated Mar. 17, 2022.
U.S. Appl. No. 17/122,422, Non Final Office Action dated Apr. 13, 2023.

* cited by examiner

SYSTEM AND METHOD FOR MANAGING DATA OBJECT CREATION

CROSS REFERENCE TO RELATED APPLICATIONS

This application claims the benefit of priority of U.S. Provisional Patent Application No. 62/948,418 filed Dec. 16, 2019, which is incorporated herein by reference in its entirety. The present disclosure is related to patent application entitled "SYSTEM AND METHOD FOR DATA INGESTION AND WORKFLOW GENERATION" filed of even date herewith, which is incorporated herein by reference.

FIELD

The present disclosure relates to computer and network systems and methods, including but not limited to systems and methods for managing data object creation.

BACKGROUND

Computer and network systems, including "big data" environments, comprise software code as well as data objects. Examples of data objects include data code schemas, databases, directory structures, tables, files, etc.

In environments that have only one object, or a few types of objects, for example a particular database, a system administrator typically implements changes to the object(s) manually. In environments having a large number of objects, or types of objects, changes can be much more frequent, and may require a number of different system administrators.

Improvements in computer and network systems are desirable.

BRIEF DESCRIPTION OF THE DRAWINGS

Embodiments of the present disclosure will now be described, by way of example only, with reference to the attached Figures.

DETAILED DESCRIPTION

A system and method are provided for managing creation of data objects, for example in a network or big data environment. A method comprises: receiving, at a processor, a data object creation command for creating the data object; comparing, at the processor, at least one data object creation parameter with a stored data object creation standard; and initiating creation of the data object in response to the data object creation parameter matching a corresponding parameter in the stored data object creation standard. The data object creation command can be modified to meet the stored data object creation standard, and to change an associated permission level. Embodiments of the present disclosure encapsulate standards defining how to create a data object, such that it is no longer necessary to have a person to make sure that these standards are followed, and automate management of object creation while ensuring conformity to organizational standards.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

In an embodiment, the present disclosure provides a computer-implemented method of managing creation of a data object. The method comprises: receiving, at a processor, a data object creation command comprising at least one data object creation parameter, the data object creation command requiring a first permission level to authorize creation of the data object but having associated therewith a second permission level lower than the first permission level; comparing, at the processor, the at least one data object creation parameter with a corresponding stored data object creation standard; in response to the data object creation parameter meeting the stored data object creation standard, modifying the data object creation command to change the second permission level to the first permission level; and initiating, by the processor, creation of the data object based on the modified data object creation command having the first permission level.

In an example embodiment, the data object creation command is generated based on a command input received from a user having the second permission level.

In an example embodiment, the data object creation command is generated by a user having a standard permission level, and the data object creation command requires system administrator permissions in order to be completed.

In an example embodiment, the object creation standard comprises an organizational standard for data object creation.

In an example embodiment, the object creation standard defines best practices with respect to data object creation.

In an example embodiment, the object creation standard is stored in a machine-readable memory accessible by the processor.

In an example embodiment, the object creation command comprises a call to create the data object.

In an example embodiment, the processor is assigned as an authorized user having a required permission level to initiate creation of the data object.

In an example embodiment, the processor is assigned as an authorized user even though a user who generated the data object creation command is not an authorized user.

In an example embodiment, the stored data object creation standard comprises a first data object creation standard, and the further comprises ensuring adherence to a second stored data object creation standard, different from the first stored data object creation standard.

In an example embodiment, the method further comprises ensuring adherence to changes in the stored data object creation standard based on modification of the stored data object creation standard.

In an example embodiment, the method further comprises determining whether the second permission level associated with the data object creation command meets the first permission level required for object creation.

In an example embodiment, the method further comprises, based on a determination that the data object creation parameter does not meet the stored data object creation standard, failing the object creation command and preventing creation of the data object.

In an example embodiment, the method further comprises, based on a determination that the data object creation parameter does not meet the stored data object creation standard, determining whether the parameter can be modified to meet the stored data object creation standard.

In an example embodiment, the method further comprises modifying the data object creation parameter to meet the stored data object creation standard.

In an example embodiment, modifying the data object creation parameter comprises running one or more standard-enforcement rules associated with the object creation parameter.

In another embodiment, the present disclosure provides an apparatus for managing creation of a data object. The apparatus comprises at least one processor; and a memory storing instructions that, when executed by the at least one processor, cause the apparatus to perform a method according to any of the embodiments as described and illustrated herein.

In a further embodiment, the present disclosure provides a system for managing creation of a data object. The system comprises: an apparatus configured to perform a method according to any of the embodiments as described and illustrated herein; and a computer-readable medium storing the data object creation standard.

In an example embodiment, the apparatus and the computer-readable medium cooperate to ensure that data object creation standards are adhered to, independent of involvement of a system administrator.

In an example embodiment, the computer-readable medium stores a plurality of object creation standards, and the apparatus is configured to enforce the plurality of object creation standards.

In an example embodiment, the plurality of object creation standards comprises a first object creation standard, and a second object creation standard, different from the first object creation standard.

In an example embodiment, the plurality of object creation standards comprises a first object creation standard, and an updated version of the first object creation standard.

In an example embodiment, the apparatus comprises: an object creation manager comprising a plurality of object creation modules, each of the plurality of object creation modules configured to communicate with a corresponding Hadoop component in a network environment.

In an example embodiment, the apparatus comprises: an object creation manager comprising a plurality of object creation modules, each of the plurality of object creation modules configured to implement data object creation or modification using asynchronous messaging.

In an example embodiment, the apparatus comprises: an object creation manager comprising a plurality of object creation modules; and a ledger cooperating with a non-transitory memory and configured to store state and persistence data relating to transactions associated with creation or modification of an object.

In an example embodiment, the apparatus comprises: an object creation management client comprising a plurality of object creation modules; and an object creation management server, in communication with the object creation management client and with a plurality of data sources, the object creation management client and the object creation management server provided on the same edge device and cooperating to perform code creation and object creation.

In an example embodiment, the apparatus and the computer-readable medium cooperate to encapsulate one or more object creation standards in an application programming interface (API) wrapper.

In an example embodiment, the apparatus is configured to invoke, via a client API, a specific data object creation API for each data object creation command invoked.

In an example embodiment, the client API indicates an outcome of a specified operation.

In another embodiment, the present disclosure provides a computer-readable medium storing instructions that, when executed, cause performance of a method according to any of the embodiments as described and illustrated herein.

In a further embodiment, the present disclosure provides a n apparatus for managing creation of a data object, comprising: a command receiver configured to receive a data object creation command for creating the data object, the data object creation command comprising at least one data object creation parameter; a command modifier configured to compare the at least one data object creation parameter with a stored data object creation standard; and an object creation initiator configured to initiate creation of the data object in response to the data object creation parameter matching a corresponding parameter in the stored data object creation standard.

In an example embodiment, the apparatus further comprises: a computer-readable medium storing the data object creation standard.

In an example embodiment, the data object creation command requires a first permission level to authorize creation of the data object, but has associated therewith a second permission level lower than the first permission level; and the command modifier is configured to, in response to the data object creation parameter meeting the stored data object creation standard, modify the data object creation command to change the second permission level to the first permission level.

In another embodiment, the present disclosure provides a computer-implemented method of creating a data object. The method comprises: receiving, at a processor, a data object creation command for creating the data object, the data object creation command comprising at least one data object creation parameter; comparing, at the processor, the at least one data object creation parameter with a stored data object creation standard; and initiating creation of the data object in response to the data object creation parameter matching a corresponding parameter in the stored data object creation standard.

In a further embodiment, the present disclosure provides an apparatus for managing creation of a data object, the apparatus comprising: at least one processor; and a memory storing instructions that, when executed by the at least one processor, cause the apparatus to perform a method according to any of the embodiments as described and illustrated herein.

In another embodiment, the present disclosure provides a system for managing creation of a data object, the system comprising: an apparatus configured to perform a method according to any of the embodiments as described and illustrated herein; and a computer-readable medium storing the data object creation standard.

In a further embodiment, the present disclosure provides a computer-readable medium storing instructions that, when executed, cause performance of a method according to any of the embodiments as described and illustrated herein.

To the extent a term used herein is not defined below, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

A data object is an application-specific logical entity, and can be a physical description of a data element. A schema can be used to define a data object. For example, a table can be defined with a schema.

In network or big data environments having code and objects, when code changes, this can have an effect on objects that are related to the code. Conversely, when an object changes in the backend, this may require changes to related code. A lot of times, code cannot be deployed without changes to those objects. If there is code deployed, when the code changes there are corresponding changes to different objects that are related to that code; there are real issues in trying to manage those object changes, which is currently all done manually.

Embodiments of the present disclosure capture object changes, and coordinate those object changes with code changes. Embodiments of the present disclosure deal with code and object infrastructure.

In an example embodiment, a method or system according to the present disclosure assists in automating "linting", which is following a standard. Example embodiments of the present disclosure consider a data structure (e.g. a directory structure) as an object, and expand linting to objects, for example following an idiomatic process, where linting is typically limited to code.

In homogeneous network environments having one object, or a few objects or types of object, a team of system administrators and developers are responsible for the object(s), even if object changes are rare. In more heterogeneous implementations or environments, for example incorporating legacy networks with current networks, object changes are much more frequent. In an example implementation, an organization has multiple business units, and each business unit has its own data structures, resulting in hundreds of different sources with different characteristics and parameters. If an organization tried to handle these object changes manually, a dedicated team of something like 100 system administrators may be needed just to deal with changes to every table, etc.

Network and big data environments can use approaches or utilities such as Hadoop to facilitate distributed storage and processing of big data. Hadoop uses loosely structured data. As such, a change to any object can introduce instability into how the data is organized, and can affect all other processes using that data, such as reports, dashboards, visualization, etc. Issues can arise not only with the introduction of a change to an existing object, and with how it propagates to and affects all interrelated components, but also with creating new objects.

Embodiments of the present disclosure are configured to define how to create a data object, such as a table or database, based on customized standards, and to change how the data object is created in response to a change in those standards. Such standards are encapsulated in embodiments of the present disclosure. By encapsulating standards, embodiments of the present disclosure no longer need a person to make sure that these standards are followed, and are configured to coordinate object changes with code changes.

Figure 1:
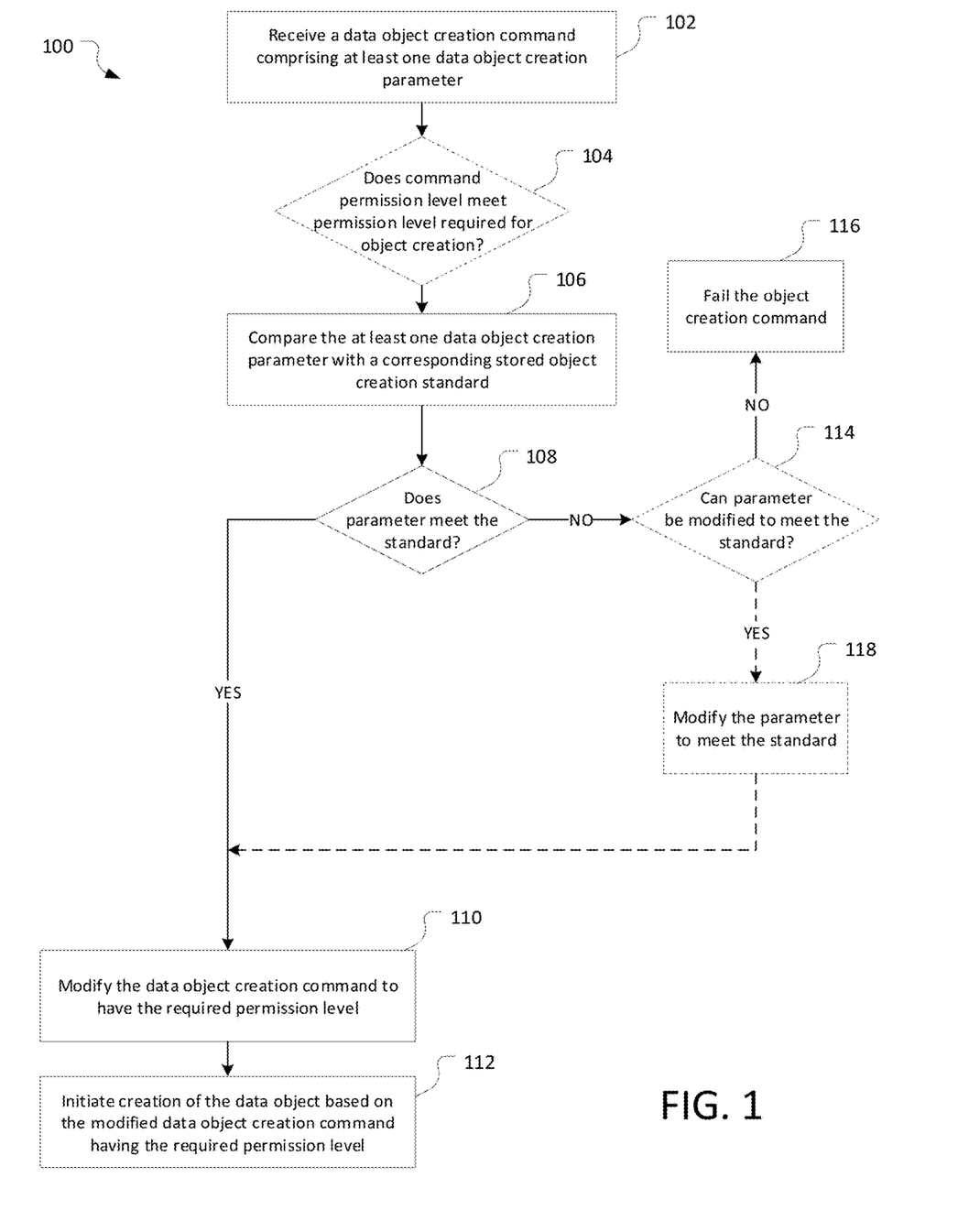
FIG. 1 is a flowchart illustrating a method of managing creation of a data object according to an embodiment of the present disclosure.

FIG. 1 is a flowchart illustrating a method 100 of managing creation of a data object according to an embodiment of the present disclosure. The operations of the method presented below are intended to be illustrative. In some embodiments, the method may be accomplished with one or more additional operations not described, and/or without one or more of the operations discussed. Additionally, the order in which the operations of the method are illustrated and described below is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method in response to instructions stored electronically on an electronic storage medium. The one or more processing devices may include one or more devices configured through hardware, firmware, and/or software to be specifically designed for execution of one or more of the operations of the method.

In an example embodiment, the method is performed in a situation in which a data object is being created, for example in a network or big data environment. In an example embodiment, the method is also performed in relation to an object creation standard, such as a corporate standard for data object creation in a big data environment. For example, an object creation standard can define preferred object definition parameters, such as parameters associated with interoperability with a particular network environment. In another example, the object creation standard defines best practices, or idiomatic code, with respect to creation of a data object, such as naming conventions for a table or role.

Known approaches require that a person having system administrator privileges, or permissions, personally review and approve an object creation request or command initiated by a person who does not have the required privileges or permissions. Often, a number of junior programmers are tasked with preparing code relating to object creation, which code is to be reviewed by a system administrator prior to being implemented. Embodiments of the present disclosure, in contrast, comprise a system or method that provides similar functionality without the need of the system administrator, freeing up resources of both the person initiating the object creation, and the system administrator.

In an example embodiment, with reference to a stored object creation standard, the system and method perform "linting" of the object creation, similar to the "linting" of software code with respect to best practices, or idiomatic code. Embodiments of the present disclosure provide an equivalent of creating idiomatic code, but with respect to data objects, for example in a big data environment, rather than software code. This can provide an advantage of ensuring that best practices and corporate standards are followed and enforced, with reduced involvement of system administrator resources.

As shown in FIG. 1, the method includes, at 102, receiving a data object creation command comprising at least one data object creation parameter. For example, the data object creation command "Make a database" comprises the action, or call, to create a data object, and the "database" as the type of data object being created, or the data object creation parameter. In an example embodiment, the data object creation command requires a first permission level to authorize creation of the data object, but has associated therewith a second permission level lower than the first permission level.

In an example implementation, the data object creation command is generated by a user, such as a junior programmer, having a standard permission level, but the data object creation command requires system administrator permissions in order to be completed or executed. In known approaches, the user generating the data object creation command would need to schedule time with a system administrator to review the command and approve it prior to the command being completed or executed.

In optional step 104, a determination is made whether a permission level associated with the data object creation command meets the permission level required for object creation. Step 104 is optional because whether or not the command has the required permission level, it is advantageous to perform the subsequent steps, to ensure conformity with, or enforcement of, an object creation standard. Embodiments of the present disclosure operate in an environment in which the data object creation command is generated at a permission level that is not sufficient for the command to be executed or completed. Optional step 104 begins a set of steps that replace the traditional role of the system administrator in the management of creation of data objects, and enables embodiments of the present disclosure to automatically enforce a data object creation standard, without involvement of a system administrator.

In an example embodiment, the creation of the data object specified in the command is effectively paused until the remaining steps are performed, for example including verification of the command against a stored object creation standard.

The method compares, at 106, the at least one data object creation parameter with a corresponding stored object creation standard. For example, if the data object creation parameter comprises a data object name, at 106 the method and system compare the data object name in the data object creation command with a stored object creation standard relating to data object names. For example, an object creation standard stored in a machine-readable memory in the system can specify that data object names must have all capital letters, and no spaces or special characters.

At 108, the method and system determine whether the data object parameter meets the stored object creation standard. Suppose a data object name of "Object 1" is specified in the data object creation command. With respect to the stored data object creation standard that specifies that data object names must have all capital letters, and no spaces or special characters, this data object name does not meet the standard.

In an embodiment, when 108 determines that the parameter does not meet the standard, the method fails the object creation command, as shown in 116, due to the non-conformity.

In an embodiment, when 108 determines that the parameter meets the standard, the method proceeds in 110 to modify the data object creation command to have the required permission level. For example, in response to the data object creation parameter meeting the stored data object creation standard, the method modifies the data object creation command to change the second permission level, which was not sufficient to authorize creation of the object, to the first permission level, which is sufficient to authorize creation of the object. Modification, at 110, of the permission level associated with the data object creation command enables the system and method to perform tasks normally performed by a system administrator, without the involvement of a system administrator.

After completion of 110, the method proceeds at 112 to initiate creation of the data object based on the modified data object creation command having the required permission level. In an example embodiment, a processor in the system initiates the creation of the data object. In an example embodiment, the processor is treated as, or assigned as, an authorized user, or a user having the required permission level to initiate creation of the data object. In an example embodiment, the system, or the processor of the system, is granted privileges similar to a system administrator, after modifying the data object creation command to have the required permission level. This is done even though the user who generated the data object creation command does not have system administrator level permission.

In an example embodiment, the system maintains integrity of the underlying network or big data system by ensuring that data object creation standards are adhered to, independent of involvement of a system administrator. Users authorized to generate a data object creation command are empowered to provide the command to the system, which takes the place of the system administrator and ensures that data object creation standards are enforced. In contrast to known approaches, no system administrator resources are used. Moreover, because the data object creation standard is stored, the system can be configured to enforce a plurality of different data object creation standards. For example, the system can store a first object creation standard for use in a first environment, and a second object creation standard for use in a second environment. The system is advantageously configured to enable enforcement of multiple object creation standards, and is flexible to enforce new standards as they are defined.

In addition to ensuring that data object creation standards are adhered to, without requiring a system administrator, the system according to an embodiment of the present disclosure also provides an advantage of taking the place of different system administrators, each having specialized knowledge of different data object creation standards. In this way, a system according to an embodiment of the present disclosure provides one or more of: ensuring adherence to a first stored data object creation standard; ensuring adherence to a second stored data object creation standard, different from the first stored data object creation standard; and ensuring adherence to changes in the first or second stored data object creation standard based on modification, in a machine-readable memory, of the stored data object creation standard.

Referring back to FIG. 1, in another embodiment, optional step 114 determines whether the parameter can be modified to meet the standard. In an example embodiment where the parameter can be modified to meet the standard, the method proceeds to 118 to modify the parameter to meet the standard. For example, in the case of the example data object name standard referred to above, the system can be configured to perform, at 118, one or more of: convert all lowercase characters to uppercase characters; convert spaces to underscores; and/or convert special characters to corresponding standard characters.

Referring to the example above, in an embodiment the method in step 118 is configured to modify the data object creation parameter "Object 1", which does not comply with the standard, to "OBJECT_1", which complies with the standard. In an example embodiment, modification of the data object creation parameter is based on performing one or more standard enforcement steps, or running one or more standard enforcement rules, associated with the object creation parameter.

In an example embodiment, the system comprises standard enforcement rules, or parameter modification rules, stored in a machine-readable memory. In such an embodiment, the conversion of characters in a data object name parameter to characters that meet the data object creation standard is based on the stored parameter modification rules. In an example embodiment, after the parameter is modified, in 118, to meet the standard, the method proceeds to 110 and 112, as described above.

Figure 2:
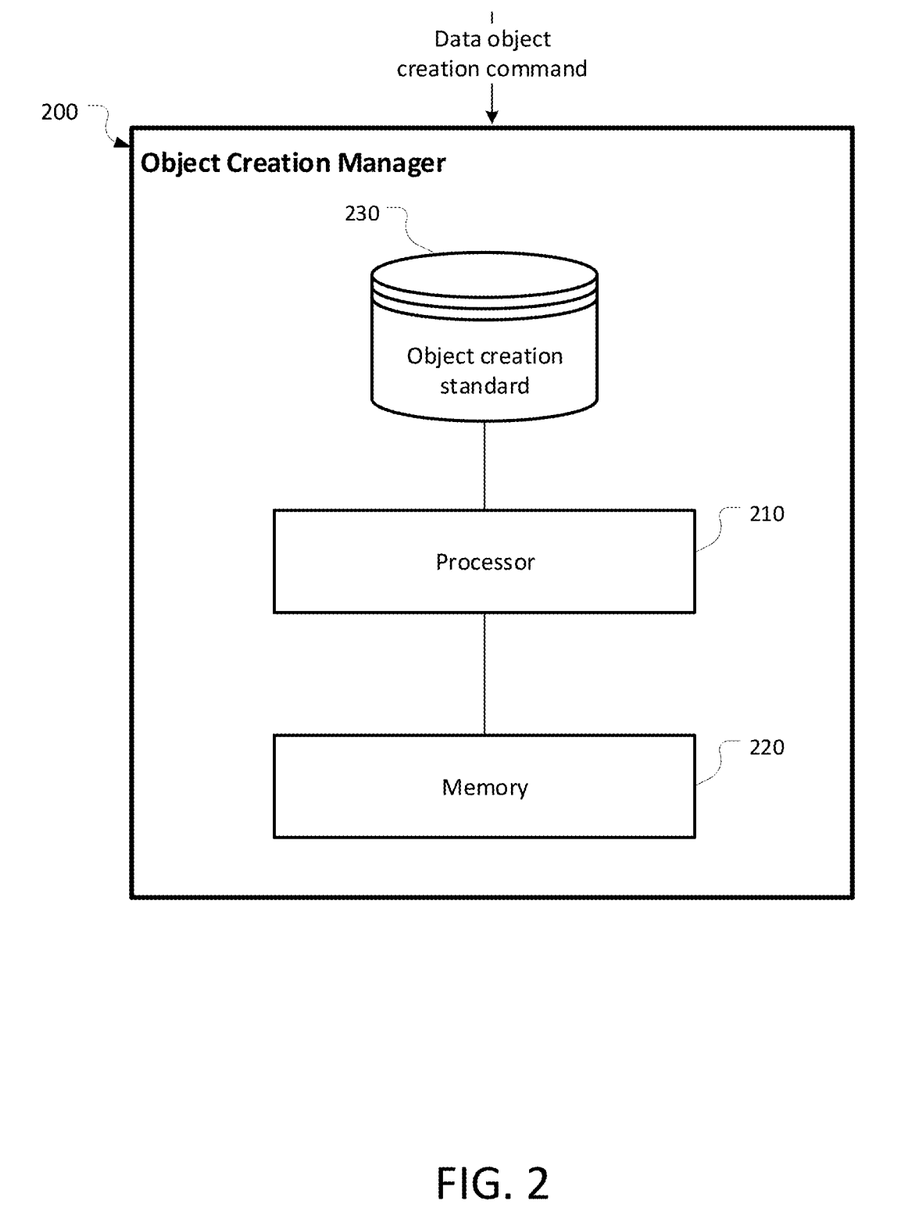
FIG. 2 is a block diagram illustrating an apparatus for managing creation of a data object according to an embodiment of the present disclosure.

FIG. 2 is a block diagram illustrating an apparatus 200 for managing creation of a data object according to an embodiment of the present disclosure. In an example embodiment, the apparatus 200 is referred to as an object creation manager. The apparatus 200 comprises at least one processor 210, a first memory 220 and a second memory 230. The first memory 220 stores instructions that, when executed by the at least one processor 210, cause the apparatus 200 to perform a method of managing creation of a data object as described herein in relation to one or more embodiments. The second memory 230 stores the data object creation standard.

Figure 3:
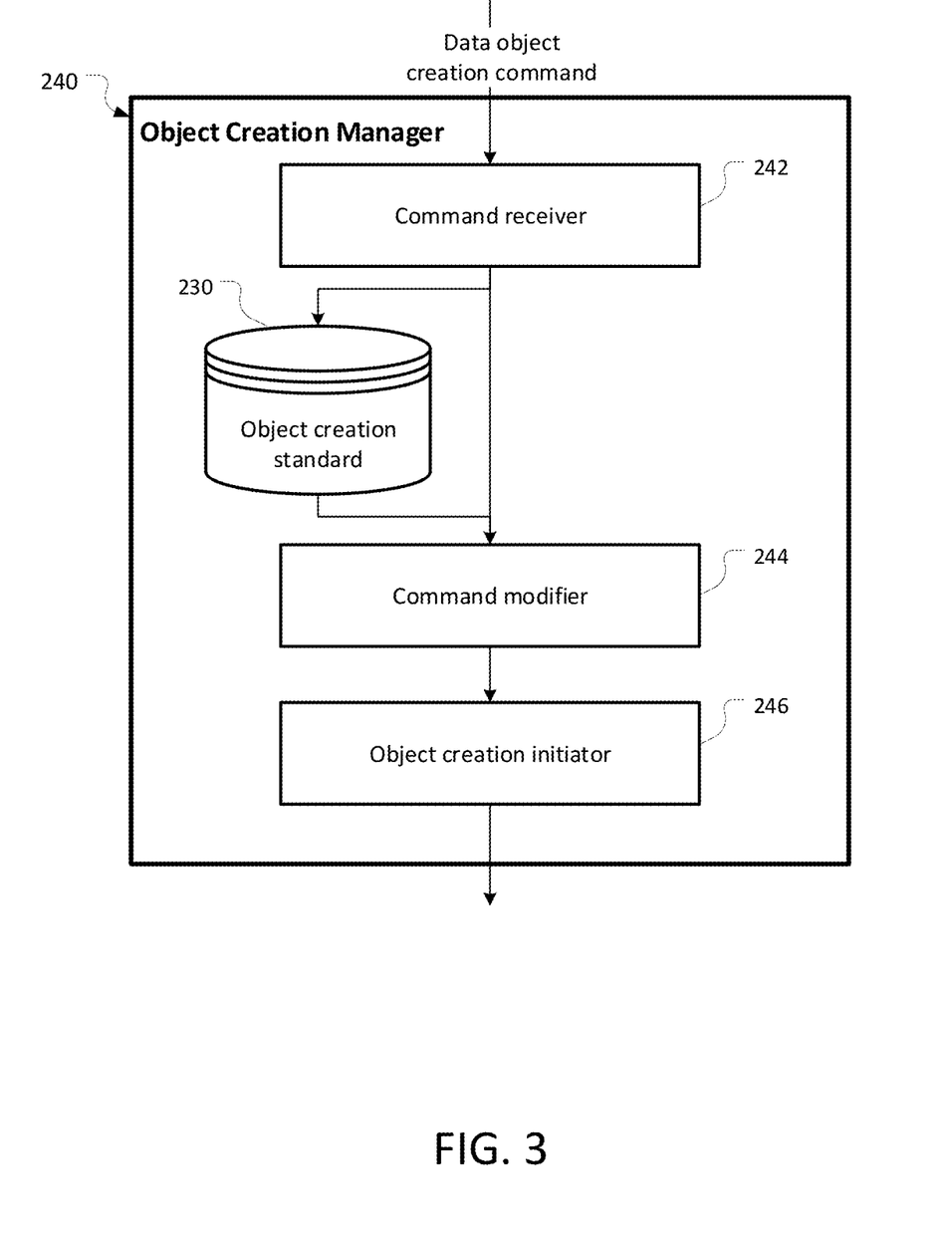
FIG. 3 is a block diagram illustrating an apparatus for managing creation of a data object according to another embodiment of the present disclosure.

FIG. 3 is a block diagram illustrating an apparatus 240 for managing creation of a data object according to another embodiment of the present disclosure. While the apparatus 200 in FIG. 2 is described in relation to physical elements, the apparatus 240 in FIG. 3 is described in relation to functional elements, which are enabled by one or more physical elements. A command receiver 242 is configured to receive a data object creation command for creating the data object, the data object creation command comprising at least one data object creation parameter. The command modifier 244 is configured to compare the at least one data object creation parameter with a stored data object creation standard, for example stored in the memory 230. The object creation initiator 246 is configured to initiate creation of the data object in response to the data object creation parameter matching a corresponding parameter in the stored data object creation standard.

In an example embodiment, the data object creation command requires a first permission level to authorize creation of the data object, but has associated therewith a second permission level lower than the first permission level. In an example embodiment, the command modifier 244 is configured to, in response to the data object creation parameter meeting the stored data object creation standard, modify the data object creation command to change the second permission level to the first permission level.

Figure 4:
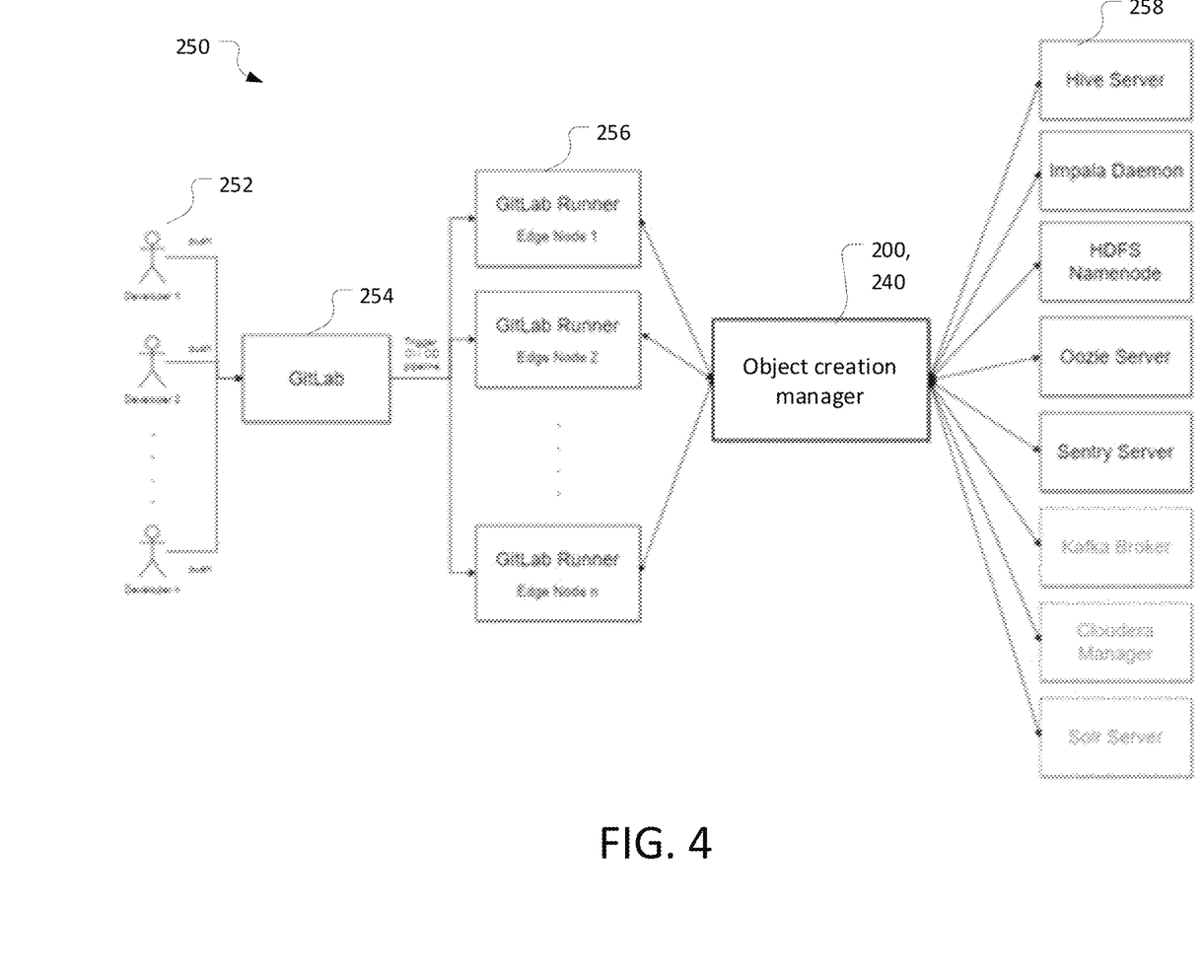
FIG. 4 is a block diagram illustrating interaction between developers and an apparatus according to an embodiment of the present disclosure.

FIG. 4 is a block diagram illustrating a network environment 250 showing interaction between developers and an apparatus according to an embodiment of the present disclosure. An example embodiment of the present disclosure provides an apparatus or system that automates certain superuser operations that are required during development and deployment, for example of Hadoop and other workflows. A superuser refers to a system administrator, or similar role, and refers to a user having increased permissions or privileges, for example the ability to perform actions that regular users cannot perform.

An apparatus or system according to an example embodiment of the present disclosure also provides abstractions to easily perform some common Hadoop operations, such as scheduling Oozie workflow jobs/coordinators. With an embodiment of the present disclosure in place, Ops engineers no longer have to spend the majority of their time managing, monitoring and orchestrating software project deployments, and can instead focus on capability building and spearheading innovation in infrastructure. This is good for all DevOps team members, because it achieves one or more of the following: automates the enforcement of process standards and best practices, thus maintaining project quality; frees Ops-focused team members to work on innovative projects rather than micro-managing deployments; frees developers from being bottlenecked by Ops during both development and deployment; and promotes (and enforces) automation of deployments, making them more robust and portable across dev, preprod and prod environments.

As shown in FIG. 4, the network environment 250 comprises an apparatus, for example an object creation manager, which is configured to manage creation of a data object, for example in accordance with the method(s) described above. As shown in FIG. 4, in an embodiment the apparatus comprises the object creation manager 200 of FIG. 2, and in another embodiment the apparatus comprises the object creation manager 240 of FIG. 3.

Embodiments of the present disclosure are configured to encapsulate one or more data architecture standards in an API wrapper along with the code to ensure compliance with of standards (linting). The API wrapper can be referred to as a data object creation API wrapper. This API wrapper can be called by the developer or system administrator without the need to have any kind of manual intervention (human eyeballs) from the developer and/or system administrator.

As shown in FIG. 4, whenever a developer 252 pushes code to their Git repos 254, for example on GitLab™, the Git repos 254 may invoke a runner 256 specified in a CI config file. Alternatively, the Git repos 254 may invoke a default runner if one or more runners have not been specified. The GitLab™ runner 256 will execute the shell commands listed in the CI config file.

In an example embodiment, for each data object creation command, a specific API will be invoked via a client API that currently resides on the edge nodes 256. This invoked API may interact with multiple Hadoop components 258. In an example embodiment, the object creation manager 200 interacts with Hive™, HDFS™, Impala™, Oozie™ and Sentry™ components 258, via specific interactions. Such components are examples only, and in another example embodiment, the object creation manager 200 interacts with other equivalent components implementing alternative approaches or from different vendors. In another example embodiment, Kafka™, Cloudera™ Manager and SoIr™ interactions are enabled between the object creation manager 200 and the respective Hadoop components 258. Such components are examples only, and in another example embodiment, the object creation manager 200 interacts with other equivalent Hadoop components implementing alternative approaches or from different vendors.

In an example embodiment, a client API of the data object creation API will indicate the outcome of the specified operation to the developer 252 by printing its status to the console. The logs can be viewed, for example through GitLab™ Web UI.

In an example embodiment, the apparatus 200 (or 240) is configured to manage creation of a plurality of types of data object creation commands. Some examples of data object creation commands include: mkproject (make a project); mkdatabase (make a database); mkrole (make a role); and mkoozie (make an oozie workflow).

Figure 5:
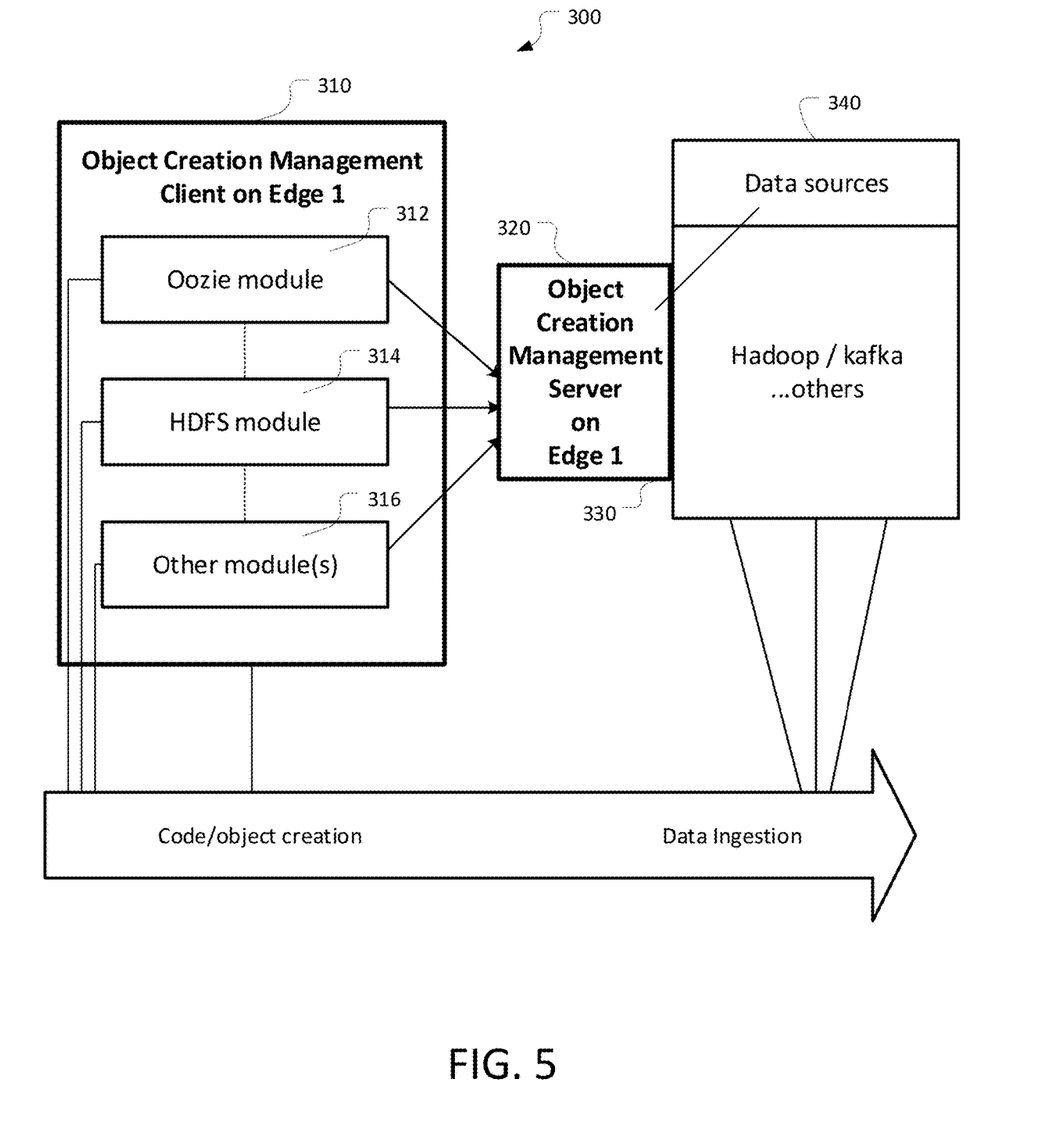
FIG. 5 is a block diagram of a network environment illustrating interaction between modules, a client, a server and loosely structured data according to an embodiment of the present disclosure.

FIG. 5 is a block diagram of a network environment 300 illustrating interaction between modules, a client, a server and loosely structured data according to an embodiment of the present disclosure. The embodiment shown in FIG. 5 is similar to the embodiment of FIG. 4, with different implementation details. An object creation management client 310 is in communication with an object creation management server 320. In an example implementation, the object creation management client 310 and the object creation management server 320 perform functions similar to the object creation manager 240 of FIG. 4. In the example embodiment of FIG. 5, the object creation management client 310 comprises an Oozie™ module 312, an HDFS™ module 314 and other module(s) 316. In an embodiment, the server 320 is in communication with loosely structured data 330 such as Hadoop, Kafka™ and others, through which the server 320 is in communication with data sources 340. The object creation management client 310 and its constituent modules are configured to perform code creation and object creation, such as described and illustrated herein. The object creation management server 330, in conjunction with the elements connected thereto, are configured to perform data ingestion.

Figure 6:
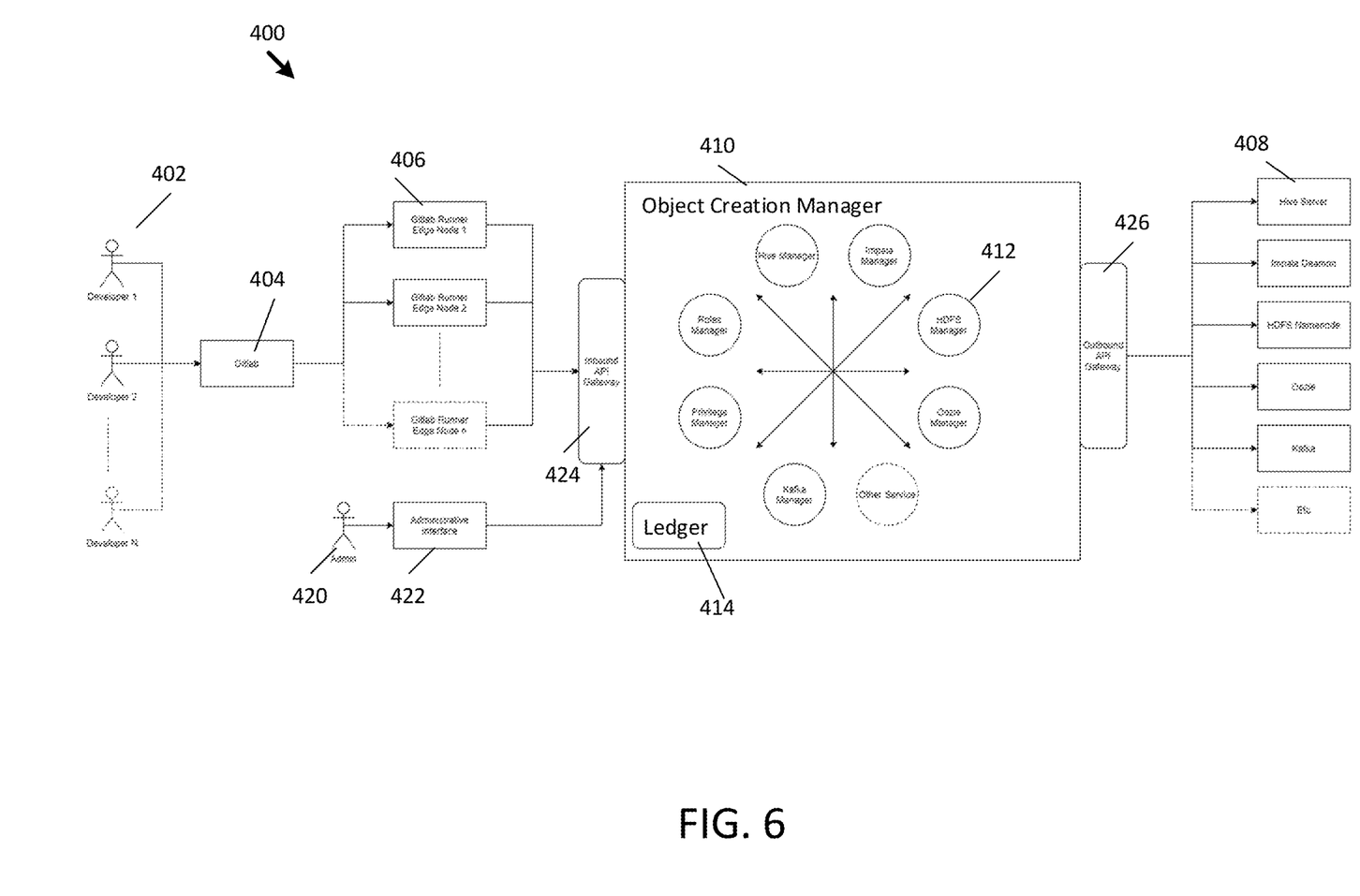
FIG. 6 is a block diagram of a network environment illustrating interaction between developers and an apparatus according to another embodiment of the present disclosure.

FIG. 6 is a block diagram of a network environment 400 illustrating interaction between developers and an apparatus according to another embodiment of the present disclosure. An object creation manager 410 is provided as part of the network environment. Some functionality in FIG. 6 is similar to FIG. 4. As shown in FIG. 6, whenever a developer 402 pushes code to their Git repos 404, for example on GitLab™, the Git repos 404 may invoke a runner 406 specified in a CI config file. Alternatively, the Git repos 404 may invoke a default runner if one or more runners have not been specified. The GitLab™ runner 406 will execute the shell commands listed in the CI config file.

In an example embodiment, for each data object creation command, a specific API will be invoked via a client API that currently resides on the edge nodes 406. This invoked API may interact with multiple Hadoop components 408. In an example embodiment, the object creation manager 400 interacts with Hive™, HDFS™, Impala™, Oozie™ and Sentry™ components 408, via specific interactions. Such components are examples only, and in another example embodiment, the object creation manager 400 interacts with other equivalent components implementing alternative approaches or from different vendors. In another example embodiment, Kafka™, SoIr™ and other Cloudera™ Manager interactions are enabled between the object creation manager 410 and the respective Hadoop components 408. Such components are examples only, and in another example embodiment, the object creation manager 400 interacts with other equivalent Hadoop components implementing alternative approaches or from different vendors. In an example embodiment, a client API of the data object creation API will indicate the outcome of the specified operation to the developer 402 by printing its status to the console. The logs can be viewed, for example through GitLab™ Web UI.

The embodiment of FIG. 6 provides a network environment in which a single language (e.g. Scala™) can be used, standardizing on one language, rather than supporting multiple languages (e.g. Scala™ and Java™). The embodiment of FIG. 6 advantageously implements a reactive architecture. The system 400 is responsive, providing the ability to respond in a timely manner, even when there are faults in the system or if the system is under load; this is achieved with resiliency and elasticity, providing for improved functioning of a computer. The system 400 is resilient, providing the ability to respond in the face of failure, by replication, containment, isolation, and delegation. Failures are contained in each component, and do not affect the system as a whole, which is advantageous and provides for improved functioning of a computer. In an example embodiment, this is achieved with asynchronous messaging.

The system 400 of the embodiment of FIG. 6 is elastic, providing the ability to stay responsive under a variety of loads. The system 400 is configured to decrease or increase resources according to system needs or requirements. In an example embodiment, this is achieved with back-pressure via asynchronous messaging. The system 400 is message driven, such that the system communicates via asynchronous messaging. This ensures loose coupling, isolation, and location transparency, all of which are advantageous and provide for improved functioning of a computer.

In the example embodiment of FIG. 6, the object creation manager 410 comprises a plurality of object creation management modules 412. In an example embodiment, an object creation management module 412 is provided for each of the multiple Hadoop components 408, as shown in FIG. 6. In an embodiment, an administrator 420 uses an administrative interface 422 to communicate with an inbound API gateway 424 in order to interact and communicate with the object creation manager 410. A corresponding outbound API gateway 426 is configured to enable messaging-based infrastructure communication between the plurality of object creation management modules 412 and the corresponding Hadoop component(s) 408. In an example embodiment, each of the plurality of object creation modules 412 comprises or leverages a non-transitory memory storing set of specific administrative steps or standards, or both, that are required to implement an operation. In an example embodiment, each of the plurality of object creation modules 412 comprises or leverages a non-transitory memory storing set of specific administrative steps or standards, or both, that are required to implement exactly one operation and only one operation.

In the example embodiment of FIG. 6, the object creation manager 410 comprises a ledger or journal 414. The ledger 414 is configured to keep or store state and persistence. In an example embodiment, the ledger 414 comprises a Kafka™ journal. The object creation manager 410 comprising the ledger 414 enables a service to start back up after a failure to rebuild the state. The object creation manager 410 comprising the ledger 414 will also provide the ability to trace operations. In an example embodiment, the ledger 414 operates on a per object basis, providing a history of transactions with respect to a particular object. In an example embodiment, the ledger 414 operates on a per module basis, providing a history of transactions with respect to a particular module, and optionally with respect to objects associated with that module.

An example embodiment of the present disclosure, as illustrated in FIG. 6, is configured to provide one or more of the following advantages: developers only need to know one language to work on it; able to scale horizontally to accommodate load; failure in a component does not bring down the entire system; provides authentication; provides state information, for example the ability to see what has happened; and ability to add features such as multi FID support. Such advantages provide an improvement to the functioning of a computer or processor of a system according to an embodiment of the present disclosure, or executing a method according to an embodiment of the present disclosure, and cooperate to provide a discernible effect or change, for example in a memory storing instructions for executing the method.

Figure 7:
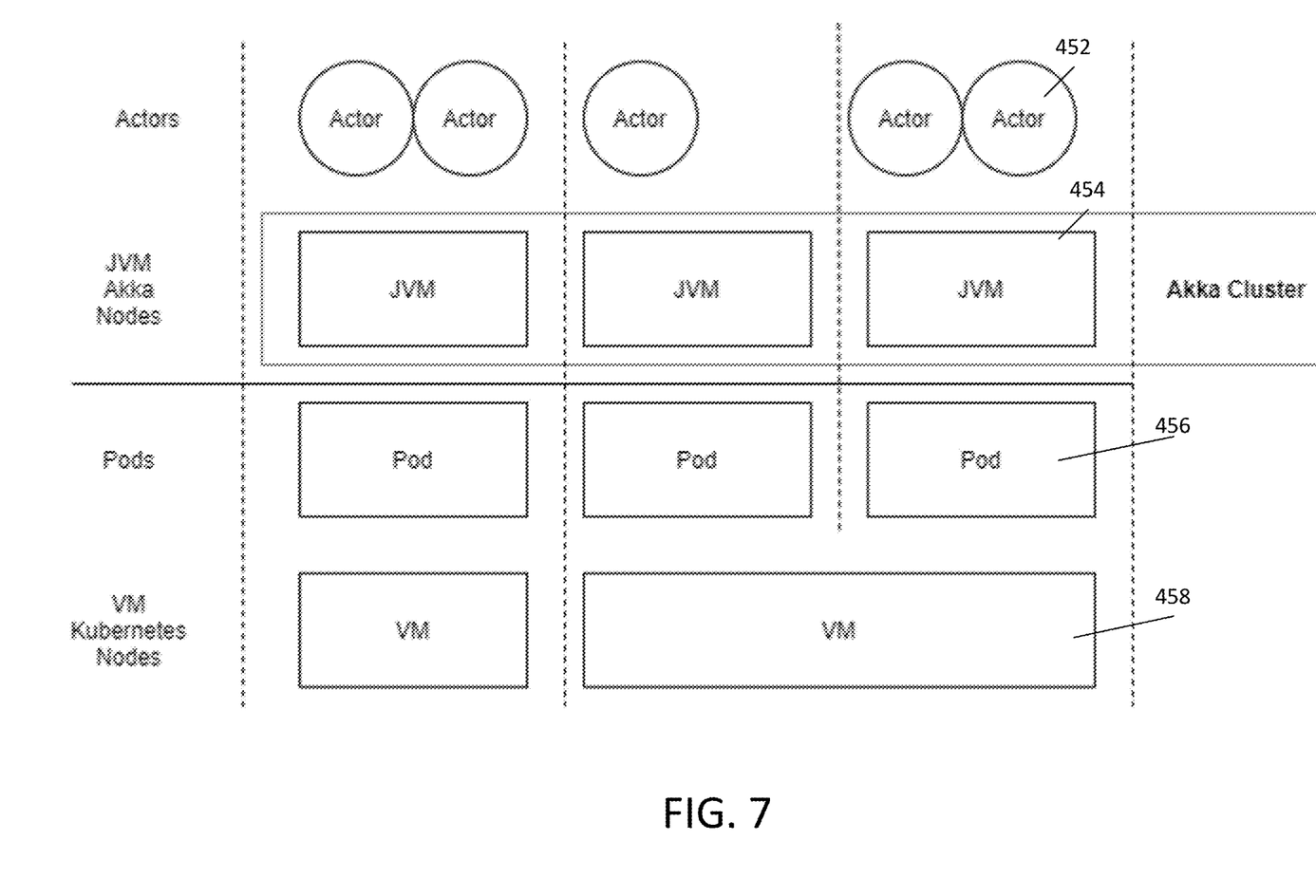
FIG. 7 is a block diagram illustrating details of an actor-based implementation of functions performed by an object creation manager according to an embodiment of the present disclosure.

FIG. 7 is a block diagram illustrating details of an actor-based implementation of functions performed by an object creation manager according to an embodiment of the present disclosure. As described above, embodiments of the present disclosure implement a reactive architecture using the actor model. Actors are a level of abstraction for distributed systems. The developer does not have to deal with thread management, and actors are built as a type of state-machine with a message box. Communication in between actors is achieved via messages, which fits well with the message-driven architecture according to an embodiment of the present disclosure. In an example embodiment, Akka™, an open source and an industry built toolset for Scala™ which leverages the Actor model, may be used to apply the reactive philosophy to building efficient microservices. In an example embodiment, each of the object creation management modules 412 of FIG. 6 comprises an actor 452. In an example embodiment, each of the plurality of actors 452 interacts with a Java™ Virtual Machine (JVM) Akka™ Node 454 in an Akka™ cluster, which is configured to interact with a corresponding pod 456 and virtual machine, such as a VM Kubernetes node, 458. The example embodiment of FIG. 7 can be described as using a single service approach. The example embodiment of FIG. 7 is also well aligned with scalable modern software architecture practices.

Figure 8:
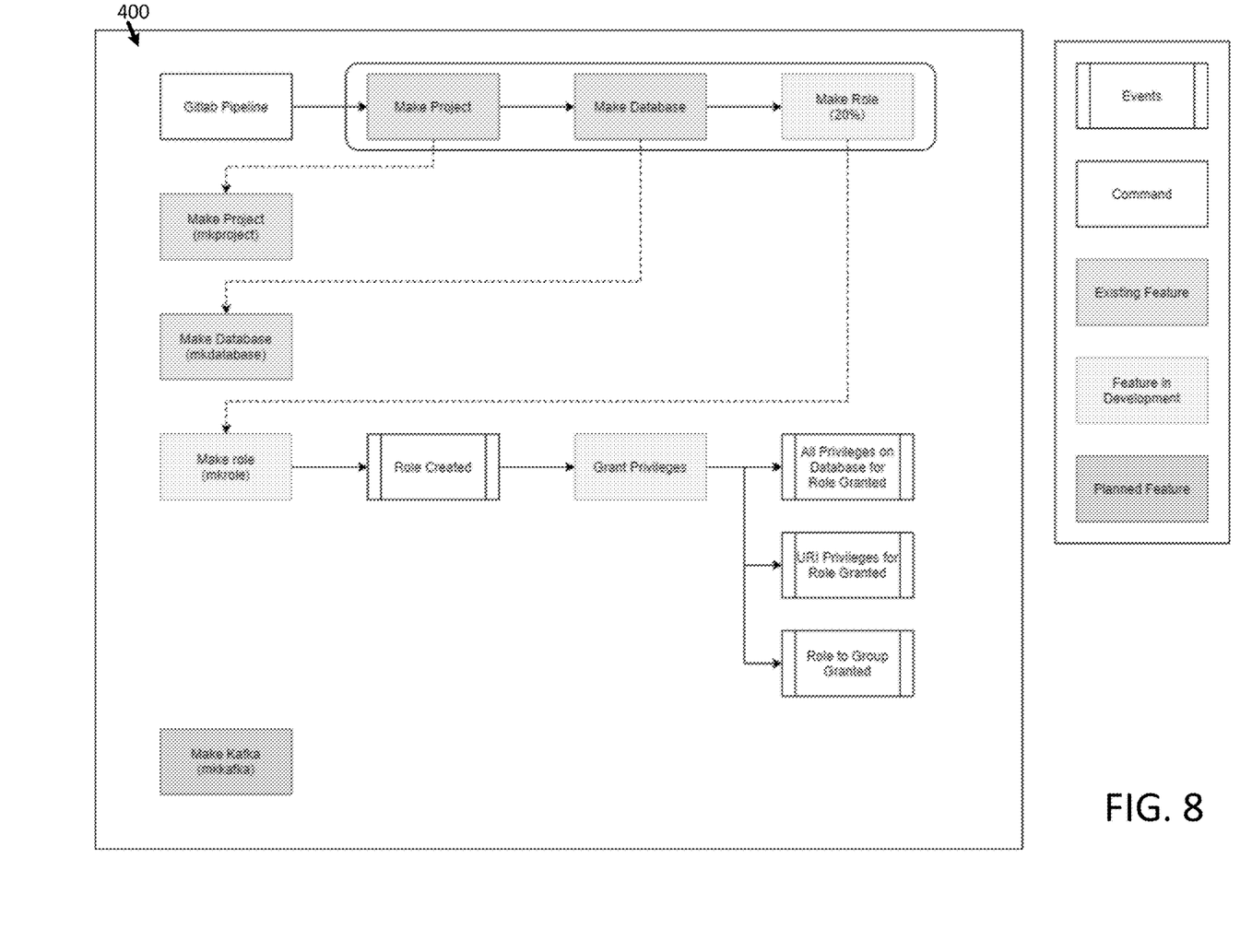
FIG. 8 is a flowchart illustrating an example flow of a method of managing creation of a data object with aggregates according to another embodiment of the present disclosure.

FIG. 8 is a flowchart illustrating an example flow of a method 400 of managing creation of a data object with aggregates according to another embodiment of the present disclosure.

Embodiments of the present disclosure provide a solution to automate data and schema changes in conjunction with the corresponding code changes. Such embodiments enable a software organization to encapsulate its in-house standards to be utilized in applications and use cases, providing a "recipe" of deployment and integration steps. In an example embodiment, the standards relevant to the organization's utilization of the technology are put in an API wrapper. The API is further improved and "linted" according to the changes and evolution to the in-house data standards, as well as future use case and application requirements. In this manner, a system according to an embodiment of the present disclosure is able to grow and consolidate, similar to a growing city, by automating management of object creation while concurrently ensuring conformity to organizational standards.

Embodiments of the present disclosure provide a method and system for encapsulating linted data standards inside custom APIs.

Embodiments of the present disclosure can be implemented with respect to software development and deployment that has to do system administrator steps and data or schema modifications, such as on Hadoop in a big data or network environment. Embodiments of the present disclosure can also be implemented with respect to any software CI/CD (continuous integration and continuous delivery and/or continuous deployment) that entails changes to data, schemas and system admin steps.

Embodiments of the present disclosure are configured to automate operations that are typically handled by system administrators. For example, embodiments of the present disclosure are configured to automate deployments of data and schema changes. Current software CI/CD solutions (e.g. Gitlab™ CI & Jenkins) handle software only. Embodiments of the present disclosure handle data and schema CI/CD, and integrates into any software CI/CD pipeline, for example Gitlab™ CI.

Embodiments of the present disclosure are applicable in any software development project that needs automated modifications to data and/or schema objects in Hadoop, for example new HDFS™ paths, new Hive™ Databases, etc.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

In some embodiments of the present disclosure, a system may include one or more computing platforms. Computing platform(s) may be configured to communicate with one or more remote platforms according to a client/server architecture, a peer-to-peer architecture, and/or other architectures. Remote platform(s) may be configured to communicate with other remote platforms via computing platform(s) and/or according to a client/server architecture, a peer-to-peer architecture, and/or other architectures. Users may access system via remote platform(s).

Computing platform(s) may be configured by machine-readable instructions. Machine-readable instructions may include one or more instruction modules. The instruction modules may include computer program modules.

In some embodiments, computing platform(s), remote platform(s), and/or external resources may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s), remote platform(s), and/or external resources may be operatively linked via some other communication media.

A given remote platform may include one or more processors configured to execute computer program modules. The computer program modules may be configured to enable an expert or user associated with the given remote platform to interface with system and/or external resources, and/or provide other functionality attributed herein to remote platform(s). By way of non-limiting example, a given remote platform and/or a given computing platform may include one or more of a server, a desktop computer, a laptop computer, a handheld computer, a tablet computing platform, a NetBook, a Smartphone, a gaming console, and/or other computing platforms.

External resources may include sources of information outside of system, external entities participating with system, and/or other resources. In some embodiments, some or all of the functionality attributed herein to external resources may be provided by resources included in system.

Computing platform(s) may include electronic storage, one or more processors, and/or other components. Computing platform(s) may include communication lines, or ports to enable the exchange of information with a network and/or other computing platforms. Computing platform(s) may include a plurality of hardware, software, and/or firmware components operating together to provide the functionality attributed herein to computing platform(s). For example, computing platform(s) may be implemented by a cloud of computing platforms operating together as computing platform(s).

Electronic storage may comprise non-transitory storage media that electronically stores information. The electronic storage media of electronic storage may include one or both of system storage that is provided integrally (i.e., substantially non-removable) with computing platform(s) and/or removable storage that is removably connectable to computing platform(s) via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processor(s), information received from computing platform(s), information received from remote platform(s), and/or other information that enables computing platform(s) to function as described herein.

Processor(s) may be configured to provide information processing capabilities in computing platform(s). As such, processor(s) may include one or more of a digital processor, an analog processor, a digital circuit designed to process information, an analog circuit designed to process information, a state machine, and/or other mechanisms for electronically processing information. In some embodiments, processor(s) may include a plurality of processing units. These processing units may be physically located within the same device, or processor(s) may represent processing functionality of a plurality of devices operating in coordination. Processor(s) may be configured to execute modules or computer-implemented methods recited herein by software; hardware; firmware; some combination of software, hardware, and/or firmware; and/or other mechanisms for configuring processing capabilities on processor(s). As used herein, the term "module" may refer to any component or set of components that perform the functionality attributed to the module. This may include one or more physical processors during execution of processor readable instructions, the processor readable instructions, circuitry, hardware, storage media, or any other components.

The above-described embodiments are intended to be examples only. Alterations, modifications and variations can be effected to the particular embodiments by those of skill in the art without departing from the scope, which is defined solely by the claims appended hereto.

What is claimed is:

1. A computer-implemented method of managing creation of a data object comprising:
   receiving, at a processor, a data object creation command comprising at least one data object creation parameter, the data object creation command requiring a first permission level to authorize creation of the data object but having associated therewith a second permission level lower than the first permission level;
   comparing, at the processor, the at least one data object creation parameter with a corresponding stored data object creation standard;
   in response to the data object creation parameter meeting the stored data object creation standard, modifying the data object creation command to change the second permission level to the first permission level; and
   initiating, by the processor, creation of the data object based on a modified data object creation command having the first permission level.

2. The computer-implemented method of claim 1, wherein the data object creation command is generated based on a command input received from a user having the second permission level.

3. The computer-implemented method of claim 1, wherein the data object creation command is generated by a user having a standard permission level, and the data object creation command requires system administrator permissions in order to be completed.

4. The computer-implemented method of claim 1, wherein the object creation standard comprises an organizational standard for data object creation.

5. The computer-implemented method of claim 1, wherein the object creation standard defines best practices with respect to data object creation.

6. The computer-implemented method of claim 1, wherein the object creation standard is stored in a machine-readable memory accessible by the processor.

7. The computer-implemented method of claim 1, wherein the object creation command comprises a call to create the data object.

8. The computer-implemented method of claim 1, wherein the processor is assigned as an authorized user having a required permission level to initiate creation of the data object.

9. The computer-implemented method of claim 8 wherein the processor is assigned as an authorized user even though a user who generated the data object creation command is not an authorized user.

10. The computer-implemented method of claim 1, wherein the stored data object creation standard comprises a first data object creation standard, and the further comprises ensuring adherence to a second stored data object creation standard, different from the first stored data object creation standard.

11. The computer-implemented method of claim 1, further comprising ensuring adherence to changes in the stored data object creation standard based on modification of the stored data object creation standard.

12. The computer-implemented method of claim 1, further comprising determining whether the second permission level associated with the data object creation command meets the first permission level required for object creation.

13. The computer-implemented method of claim 1, further comprising, based on a determination that the data object creation parameter does not meet the stored data object creation standard, failing the object creation command and preventing creation of the data object.

14. The computer-implemented method of claim 1, further comprising, based on a determination that the data object creation parameter does not meet the stored data object creation standard, determining whether the parameter is modifiable to meet the stored data object creation standard.

15. The computer-implemented method of claim 14, further comprising modifying the data object creation parameter to meet the stored data object creation standard.

16. The computer-implemented method of claim 15, wherein modifying the data object creation parameter comprises running one or more standard-enforcement rules associated with the object creation parameter.

17. A non-transitory computer-readable medium storing instructions that, when executed, cause performance of a computer-implemented method of managing creation of a data object comprising:
   receiving, at a processor, a data object creation command comprising at least one data object creation parameter, the data object creation command requiring a first permission level to authorize creation of the data object but having associated therewith a second permission level lower than the first permission level;
   comparing, at the processor, the at least one data object creation parameter with a corresponding stored data object creation standard;
   in response to the data object creation parameter meeting the stored data object creation standard, modifying the data object creation command to change the second permission level to the first permission level; and
   initiating, by the processor, creation of the data object based on the modified data object creation command having the first permission level.

18. A system for managing creation of a data object, the system comprising:
   an apparatus configured to perform a computer-implemented method of managing creation of a data object comprising:
      receiving, at a hardware processor, a data object creation command comprising at least one data object creation parameter, the data object creation command requiring a first permission level to authorize creation of the data object but having associated therewith a second permission level lower than the first permission level;
      comparing, at the hardware processor, the at least one data object creation parameter with a corresponding stored data object creation standard;
      in response to the data object creation parameter meeting the stored data object creation standard, modifying the data object creation command to change the second permission level to the first permission level; and
      initiating, by the hardware processor, creation of the data object based on the modified data object creation command having the first permission level; and
   a computer-readable medium storing the data object creation standard.

19. The system of claim 18 wherein the apparatus and the computer-readable medium cooperate to ensure adherence to data object creation standards, independent of involvement of a system administrator.

20. The system of claim 18 wherein the computer-readable medium stores a plurality of object creation standards, and the apparatus is configured to enforce the plurality of object creation standards.

21. The system of claim 20 wherein the plurality of object creation standards comprises a first object creation standard, and a second object creation standard, different from the first object creation standard.

22. The system of claim 20 wherein the plurality of object creation standards comprises a first object creation standard, and an updated version of the first object creation standard.

23. The system of claim 18 wherein the apparatus comprises:
   an object creation manager comprising a plurality of object creation modules, each of the plurality of object creation modules configured to communicate with a corresponding Hadoop component in a network environment.

24. The system of claim 18 wherein the apparatus comprises:
   an object creation manager comprising a plurality of object creation modules, each of the plurality of object creation modules configured to implement data object creation or modification using asynchronous messaging.

25. The system of claim 18 wherein the apparatus comprises:
   an object creation manager comprising a plurality of object creation modules; and
   a ledger cooperating with a non-transitory memory and configured to store state and persistence data relating to transactions associated with creation or modification of an object.

26. The system of claim 18 wherein the apparatus comprises:
   an object creation management client comprising a plurality of object creation modules; and
   an object creation management server, in communication with the object creation management client and with a plurality of data sources,
   the object creation management client and the object creation management server provided on the same edge device and cooperating to perform code creation and object creation.

27. An apparatus for managing creation of a data object, comprising:
   a hardware processor, and
   a computer-readable medium in communication with the hardware processor and having instructions stored thereon that when executed by the hardware processor, cause the hardware processor to enable a command receiver, a command modifier, and an object creation initiator, wherein:
   the command receiver is configured to receive a data object creation command for creating the data object, the data object creation command comprising at least one data object creation parameter;
   the command modifier is configured to compare the at least one data object creation parameter with a stored data object creation standard; and
   the object creation initiator is configured to initiate creation of the data object in response to the data object creation parameter matching a corresponding parameter in the stored data object creation standard.

28. The apparatus of claim 27 further comprising:
   the computer-readable medium stores the data object creation standard.

29. The apparatus of claim 27 wherein:
the data object creation command requires a first permission level to authorize creation of the data object, but has associated therewith a second permission level lower than the first permission level; and
the command modifier is configured to, in response to the data object creation parameter meeting the stored data object creation standard, modify the data object creation command to change the second permission level to the first permission level.

* * * * *